United States Patent
Rule et al.

(10) Patent No.: US 10,911,101 B2
(45) Date of Patent: *Feb. 2, 2021

(54) DYNAMIC POWER LEVELS IN NFC CARD COMMUNICATIONS

(71) Applicant: Capital One Services, LLC, McLean, VA (US)

(72) Inventors: Jeffrey Rule, Chevy Chase, MD (US); Rajko Ilincic, Annandale, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/678,269

(22) Filed: Nov. 8, 2019

(65) Prior Publication Data

US 2020/0395980 A1 Dec. 17, 2020

Related U.S. Application Data

(63) Continuation of application No. 16/442,603, filed on Jun. 17, 2019, now Pat. No. 10,516,447.

(51) Int. Cl.
   *H04B 5/00* (2006.01)
   *H02J 50/40* (2016.01)
   *G06K 7/10* (2006.01)
   *H02J 50/80* (2016.01)

(52) U.S. Cl.
   CPC ....... *H04B 5/0037* (2013.01); *G06K 7/10217* (2013.01); *H02J 50/40* (2016.02); *H02J 50/80* (2016.02); *H04B 5/0031* (2013.01)

(58) Field of Classification Search
   CPC .................................................. H04B 5/0037
   USPC .......................................................... 235/492
   See application file for complete search history.

(56) References Cited

U.S. PATENT DOCUMENTS

| 8,559,872 | B2 * | 10/2013 | Butler | G06K 19/0701 |
| | | | | 455/41.1 |
| 2013/0029685 | A1 * | 1/2013 | Moshfeghi | G01S 19/48 |
| | | | | 455/456.1 |
| 2015/0180542 | A1 * | 6/2015 | Jang | H04B 5/0087 |
| | | | | 455/41.1 |

(Continued)

OTHER PUBLICATIONS

International Search Report and Written Opinion for International Patent Application No. PCT/US2020/036613 dated Sep. 11, 2020, 32 pages.

(Continued)

*Primary Examiner* — Allyson N Trail
(74) *Attorney, Agent, or Firm* — Kacvinsky Daisak Bluni PLLC

(57) ABSTRACT

Various embodiments are directed to dynamically and temporarily adjusting power to an NFC reader of a computing device from a first power level to a second power level based on a feedback mechanism between a contactless card and the computing device. The contactless card may provide a message containing a checksum. The computing device may receive the message and calculate a checksum based on the received message. By comparing these two checksums, it may be determined whether the entire message has been correctly received. If not, the power to the NFC reader may be temporarily increased to allow better communication between the contactless card and the computing device.

20 Claims, 10 Drawing Sheets

(56) References Cited

U.S. PATENT DOCUMENTS

| | | | |
|---|---|---|---|
| 2016/0072556 A1* | 3/2016 | Lee | H04B 5/0075 |
| | | | 455/41.1 |
| 2016/0119300 A1 | 4/2016 | Studerus et al. | |
| 2016/0342819 A1* | 11/2016 | Lamba | H04B 5/0031 |
| 2018/0076855 A1 | 3/2018 | Tiedemann | |

OTHER PUBLICATIONS

Sabella et al., "NFC for Dummies, 1st Edition", Chapter 3, pp. 51-52, Apr. 11, 2016.

\* cited by examiner

700

PAYLOAD 702

PAYLOAD PORTION 704

↳ STORE IN MEMORY

PAYLOAD PORTION 706

↳ STORE AND CALCULATE CHECKSUM FOR PPs 704 + 706

PAYLOAD PORTION 708

↳ STORE AND CALCULATE CHECKSUM FOR PPs 704 + 706 + 708

PAYLOAD PORTION 710

↳ STORE AND CALCULATE CHECKSUM FOR PPs 704 + 706 + 708 + 710

FIG. 7

DYNAMIC POWER LEVELS IN NFC CARD COMMUNICATIONS

RELATED APPLICATIONS

This application is a continuation of U.S. patent application Ser. No. 16/442,603, entitled "DYNAMIC POWER LEVELS IN NFC CARD COMMUNICATIONS" filed on Jun. 17, 2019. The contents of the aforementioned application are incorporated herein by reference.

BACKGROUND

Near-field communication (NFC) is a set of communication protocols that enable two NFC-enabled components to establish communication by bringing them physically close to each other. One example of an NFC-enabled component may be a portable computing device, such as a smartphone. Another example of an NFC-enabled component may be a contactless card, which may be a credit-card sized article that contains embedded integrated circuits configured to communicate with a terminal device, such as the smartphone, via NFC.

Typically, for a smartphone and a contactless card to communicate with each other, the contactless card must be placed next to the smartphone in a precise manner to achieve NFC read-and-write capabilities. For complex transactions that require multiple reads and writes between the smartphone and the contactless card, the card may be required to be placed in a specific "sweet spot" near the smartphone for a predetermined amount of time.

Requiring a user, however, to precisely place a contactless card at a sweet spot for a specific duration of time is not only cumbersome, but also highly unreliable. Thus, there is a need to compensate for user imprecision and improve overall card usability.

SUMMARY

Various embodiments are directed to dynamically and temporarily adjusting power to an NFC reader of a computing device from a first power level to a second power level based on a feedback mechanism between a contactless card and the computing device. The contactless card may provide a message containing a checksum. The computing device may receive the message and calculate a checksum based on the received message. By comparing these two checksums, it may be determined whether the entire message has been correctly received. If not, the power to the NFC reader may be temporarily increased to allow better communication between the contactless card and the computing device.

BRIEF DESCRIPTION OF THE DRAWINGS

FIG. 7 illustrates an example store-and-compare technique for one or more portions of an NDEF message in accordance with one or more embodiments.

DETAILED DESCRIPTION

Figure 1A:
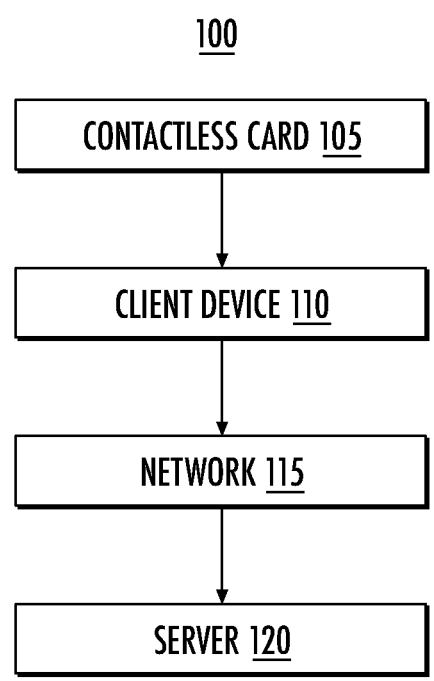
FIG. 1A illustrates an example data transmission system in accordance with one or more embodiments.

Various embodiments are generally directed to dynamically adjusting power to an NFC reader of a device to improve communication with an NFC-enabled component. For example, the device may be a mobile computing device, such as a smartphone, and the NFC-enabled component may be a contactless card. The mobile computing device may be configured to assess the accuracy, integrity, and/or completeness of communication from the contactless card, and based on this assessment, the mobile computing device may temporarily increase power to the NFC reader, for instance, from a first power level (e.g., default power setting) to a second power level (e.g., a fraction or portion of the maximum power setting). In at least that regard, a more powerful magnetic field may be temporarily created by the NFC reader, which may provide a stronger electrical field to the contactless card, thereby improving the communication between the mobile computing device and the contactless card.

In embodiments, a feedback mechanism may be configured between the mobile computing device and the contactless card for the computing device to assess the accuracy, integrity, and/or completeness of a message or a file received from the contactless card. For example, when the contactless card enters an active magnetic field generated by the NFC reader of the mobile computing device, the contactless card may send an NFC Data Exchange Format (NDEF) message or file that contains a payload with a checksum. When the mobile computing device detects the NDEF message, the device may calculate a checksum using a checksum algorithm or function and determine whether the calculated checksum matches the checksum contained in the NDEF message. If the checksums do not match or is incorrect or incomplete, then power to the NFC reader (e.g., the NFC reader coil) may be temporarily increased to create a stronger magnetic field. This process may be repeated until the checksums match or until the entire NDEF message has been received. After the NDEF message has been successfully received, or after a predetermined duration of time (even if the NFC reader fails to read the NDEF message), the power to the NFC may be stepped down to normal or default levels.

According to examples, the mobile computing device may determine what percentage of the NDEF message was correctly received, for example, based on the calculated checksum. Depending on this percentage, the power to the NFC reader may be ramped up accordingly. For instance, if only 45 percent of the message was detected or received by the mobile computing device, then the ramped-up power to the NFC reader may be 55 percent of the maximum power that is providable to the NFC reader without causing damage to the reader coil. Thus, in other words, the second power level, or the dynamically adjusted power level, may be a fraction or portion of a maximum power providable to the NFC reader, where the fraction is inversely proportional to the percentage of the NDEF message that has been correctly detected or received. In other instances, if the percentage of the message that was correctly received is below a predetermined threshold percentage, such as 20 percent, then the power to the NFC reader may be increased to the maximum power level.

In further examples, the mobile computing device may determine which portions of the full NDEF message has been correctly received every time the contactless card is read, for instance, at the adjusted power levels. Those portions of the message may be stored in memory. The mobile computing device may then compare the stored portions of the message to determine if the content of the message has been acquired in its entirety.

In previous solutions, a single power setting on the NFC reader has been typically used to communicate with a contactless card, which placed an undue burden on the user to place the contactless card near the mobile computing device in a precise manner. The embodiments and examples described herein overcome and are advantageous over the previous solutions in that they compensate for user imprecision and improves card usability by dynamically and temporarily ramping up power to the NFC reader to improve card communication when needed.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1A illustrates an example data transmission system according to one or more embodiments. As further discussed below, system 100 may include contactless card 105, client device 110, network 115, and server 120. Although FIG. 1A illustrates single instances of the components; system 100 may include any number of components.

System 100 may include one or more contactless cards 105, which are further explained below with reference to FIG. 3A and FIG. 3B. In some embodiments, contactless card 105 may be in wireless communication, utilizing NFC in an example, with client device 110.

System 100 may include client device 110, which may be a network-enabled computer. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. Client device 110 also may be a mobile computing device, for example, an iPhone, iPod, iPad from Apple® or any other suitable device running Apple's iOS® operating system, any device running Microsoft's Windows® Mobile operating system, any device running Google's Android® operating system, and/or any other suitable mobile computing device, such as a smartphone, a tablet, or like wearable mobile device.

The client device 110 device can include a processor and a memory, and it is understood that the processing circuitry may contain additional components, including processors, memories, error and parity/CRC checkers, data encoders, anti-collision algorithms, controllers, command decoders, security primitives, and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device 110 of system 100 may execute one or more applications, such as software applications, that enable, for example, network communications with one or more components of system 100 and transmit and/or receive data.

Client device 110 may be in communication with one or more servers 120 via one or more networks 115 and may operate as a respective front-end to back-end pair with server 120. Client device 110 may transmit, for example from a mobile device application executing on client device 110, one or more requests to server 120. The one or more requests may be associated with retrieving data from server 120. Server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests.

System 100 may include one or more networks 115. In some examples, network 115 may be one or more of a wireless network, a wired network or any combination of wireless network and wired network and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access (CDMA) based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 802.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may include a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to the memory. Server 120 may be configured as a central system, server or platform to control and call various data at different times to execute a plurality of workflow actions. Server 120 may be configured to connect to the one or more databases. Server 120 may be connected to at least one client device 110.

Figure 1B:
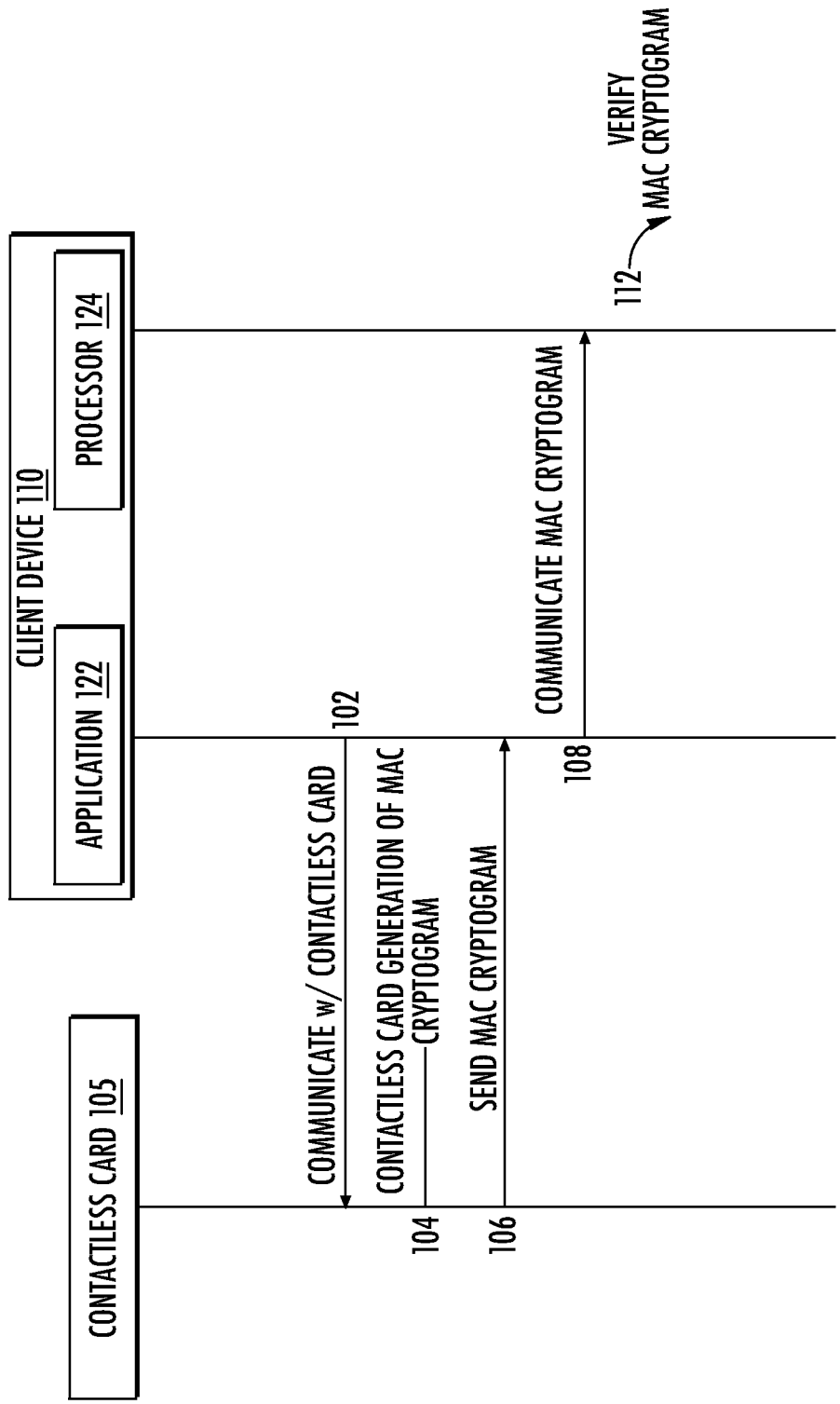
FIG. 1B illustrates an example sequence diagram for providing authenticated access in accordance with one or more embodiments.

FIG. 1B illustrates an example sequence diagram for providing authenticated access according to one or more embodiments. The diagram may include contactless card 105 and client device 110, which may include an application 122 and processor 124. FIG. 1B may reference similar components as illustrated in FIG. 1A.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram. In some examples, this may occur when the contactless card 105 is read by the application 122. In particular, this may occur upon a read, such as an NFC read, of a near field data exchange (NDEF) tag, which may be created in accordance with the NFC Data Exchange Format.

For example, a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file," "Read Capabilities file," and "Select NDEF file." At this point, a counter value maintained by the contactless card 105 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples, the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC. However, the present disclosure is not limited thereto. In other examples, this communication may occur via Bluetooth, Wi-Fi, or other means of wireless data communication.

At step 108, the application 122 communicates the MAC cryptogram to the processor 124. At step 112, the processor 124 verifies the MAC cryptogram pursuant to an instruction from the application 122. For example, the MAC cryptogram may be verified, as explained below.

In some examples, verifying the MAC cryptogram may be performed by a device other than client device 110, such as a server 120 in data communication with the client device 110 (as shown in FIG. 1A). For example, processor 124 may output the MAC cryptogram for transmission to server 120, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

It may be understood that in some examples, the contactless card 105 may initiate communication after the contactless card is brought near the client device 110. By way of example, the contactless card 105 may send the client device 110 a message, for instance, indicating that the contactless card has established communication. Thereafter, the application 122 of client device 110 may proceed to communicate with the contactless card at step 102, as described above.

Figure 2:
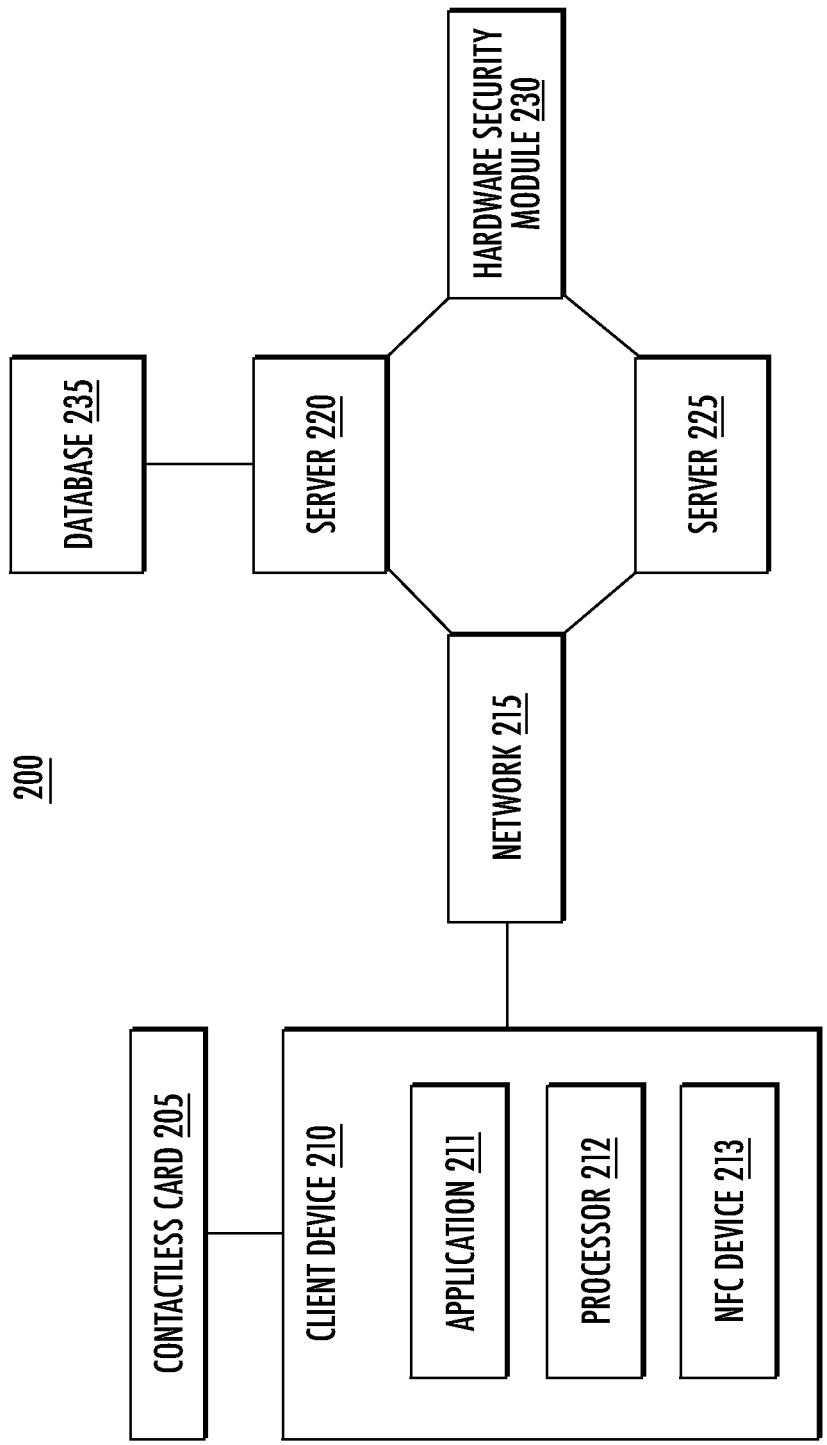
FIG. 2 illustrates an example system using a contactless card in accordance with one or more embodiments.

FIG. 2 illustrates an example system 200 using a contactless card. System 200 may include a contactless card 205, one or more client devices 210, network 215, servers 220, 225, one or more hardware security modules 230, and a database 235. Although FIG. 2 illustrates single instances of the components, system 200 may include any number of components.

System 200 may include one or more contactless cards 205, which are further explained below with respect to FIG. 3A and FIG. 3B. In some examples, contactless card 205 may be in wireless communication, for example, NFC communication, with client device 210. For example, contactless card 205 may include one or more chips, such as a radio frequency identification chip, configured to communicate via NFC or other short-range protocols. In other embodiments, contactless card 205 may communicate with client device 210 through other means including, but not limited to, Bluetooth, satellite, Wi-Fi, wired communications, and/or any combination of wireless and wired connections. According to some embodiments, contactless card 205 may be configured to communicate with card reader 213 (which may otherwise be referred to herein as NFC reader, NFC card reader, or reader) of client device 210 through NFC when the contactless card 205 is within range of card reader 213. In other examples, communications with contactless card 205 may be accomplished through a physical interface, e.g., a universal serial bus interface or a card swipe interface.

System 200 may include client device 210, which may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. One or more client devices 210 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device. In some examples, the client device 210 may be the same as, or similar to, a client device 110 as described with reference to FIG. 1A or FIG. 1B.

Client device 210 may be in communication with one or more servers 220 and 225 via one or more networks 215. Client device 210 may transmit, for example from an application 211 executing on client device 210, one or more requests to one or more servers 220 and 225. The one or more requests may be associated with retrieving data from one or more servers 220 and 225. Servers 220 and 225 may receive the one or more requests from client device 210. Based on the one or more requests from client device 210, one or more servers 220 and 225 may be configured to retrieve the requested data from one or more databases 235. Based on receipt of the requested data from the one or more databases 235, one or more servers 220 and 225 may be configured to transmit the received data to client device 210, the received data being responsive to one or more requests.

System 200 may include one or more hardware security modules (HSM) 230. For example, one or more HSMs 230 may be configured to perform one or more cryptographic operations as disclosed herein. In some examples, one or more HSMs 230 may be configured as special purpose security devices that are configured to perform the one or more cryptographic operations. The HSMs 230 may be configured such that keys are never revealed outside the HSM 230, and instead, are maintained within the HSM 230. For example, one or more HSMs 230 may be configured to perform at least one of key derivations, decryption, and MAC operations. The one or more HSMs 230 may be contained within or may be in data communication with, servers 220 and 225.

System 200 may include one or more networks 215. In some examples, network 215 may be one or more of a wireless network, a wired network or any combination of wireless network and wired network, and may be configured to connect client device 210 to servers 220 and/or 225. For example, network 215 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based (CDMA) systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from contactless card 205 and client device 210 may include NFC communication, the cellular network between client device 210 and a carrier, and Internet between the carrier and a back-end.

In addition, network 215 may include, without limitation, telephone lines, fiber optics, IEEE Ethernet 802.3, a wide area network, a wireless personal area network, a local area network, or a global network such as the Internet. In addition, network 215 may support an Internet network, a wireless communication network, a cellular network, or the like, or any combination thereof. Network 215 may further include one network, or any number of the exemplary types of networks mentioned above, operating as a stand-alone network or in cooperation with each other. Network 215 may utilize one or more protocols of one or more network elements to which they are communicatively coupled. Network 215 may translate to or from other protocols to one or more protocols of network devices. Although network 215 is depicted as a single network, it should be appreciated that according to one or more examples, network 215 may include a plurality of interconnected networks, such as, for example, the Internet, a service provider's network, a cable television network, corporate networks, such as credit card association networks, and home networks.

In various examples according to the present disclosure, client device 210 of system 200 may execute one or more applications 211 and include one or more processors 212, and one or more card readers 213. For example, one or more applications 211, such as software applications, may be configured to enable, for example, network communications with one or more components of system 200 and transmit and/or receive data. It is understood that although only single instances of the components of client device 210 are illustrated in FIG. 2, any number of devices 210 may be used. Card reader 213 may be configured to read from and/or communicate with contactless card 205. In conjunction with the one or more applications 211, card reader 213 may communicate with the contactless card 205. In examples, the card reader 213 may include circuitry or circuitry components, e.g., NFC reader coil, that generates a magnetic field to allow communication between the client device 210 and the contactless card 205.

The application 211 of any of client device 210 may communicate with the contactless card 205 using short-range wireless communication (e.g., NFC). The application 211 may be configured to interface with a card reader 213 of client device 210 configured to communicate with a contactless card 205. As should be noted, those skilled in the art would understand that a distance of less than twenty centimeters is consistent with NFC range.

In some embodiments, the application 211 communicates through an associated reader (e.g., card reader 213) with the contactless card 205.

In some embodiments, card activation may occur without user authentication. For example, a contactless card 205 may communicate with the application 211 through the card reader 213 of the client device 210 through NFC. The communication (e.g., a tap of the card proximate the card reader 213 of the client device 210) allows the application 211 to read the data associated with the card and perform an activation. In some cases, the tap may activate or launch application 211 and then initiate one or more actions or communications with an account server 225 to activate the card for subsequent use. In some cases, if the application 211 is not installed on client device 210, a tap of the card against the card reader 213 may initiate a download of the application 211 (e.g., navigation to an application download page). Subsequent to installation, a tap of the card may activate or launch the application 211, and then initiate (e.g., via the application or other back-end communication) activation of the card. After activation, the card may be used in various transactions including commercial transactions.

According to some embodiments, the contactless card 205 may include a virtual payment card. In those embodiments, the application 211 may retrieve information associated with the contactless card 205 by accessing a digital wallet implemented on the client device 210, wherein the digital wallet includes the virtual payment card. In some examples, virtual payment card data may include one or more static or dynamically generated virtual card numbers.

Server 220 may include a web server in communication with database 235. Server 225 may include an account server. In some examples, server 220 may be configured to validate one or more credentials from contactless card 205 and/or client device 210 by comparison with one or more credentials in database 235. Server 225 may be configured to authorize one or more requests, such as payment and transaction, from contactless card 205 and/or client device 210.

Figure 3A:
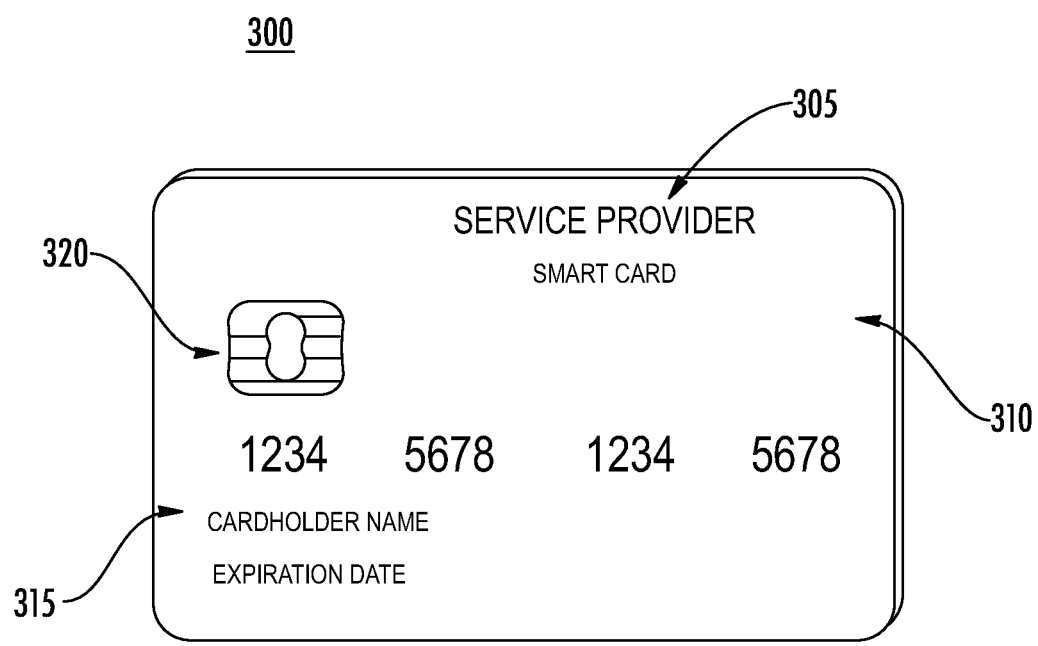
FIG. 3A illustrates an example contactless card in accordance with one or more embodiments.

FIG. 3A illustrates one or more contactless cards 300, which may include a payment card, such as a credit card, debit card, or gift card, issued by a service provider 305 displayed on the front or back of the card 300. In some examples, the contactless card 300 is not related to a payment card and may include, without limitation, an identification card. In some examples, the payment card may include a dual interface contactless payment card. The contactless card 300 may include a substrate 310, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card may otherwise be compliant with the ISO/IEC 14443 standard. However, it is understood that the contactless card 300 according to the present disclosure may have different characteristics, and the present disclosure does not require a contactless card to be implemented in a payment card.

The contactless card 300 may also include identification information 315 displayed on the front and/or back of the card, and a contact pad 320. The contact pad 320 may be configured to establish contact with another communication device, such as a user device, smart phone, laptop, desktop, or tablet computer. The contactless card 300 may also include processing circuitry, antenna and other components not shown in FIG. 3A. These components may be located behind the contact pad 320 or elsewhere on the substrate 310. The contactless card 300 may also include a magnetic strip or tape, which may be located on the back of the card (not shown in FIG. 3A).

Figure 3B:
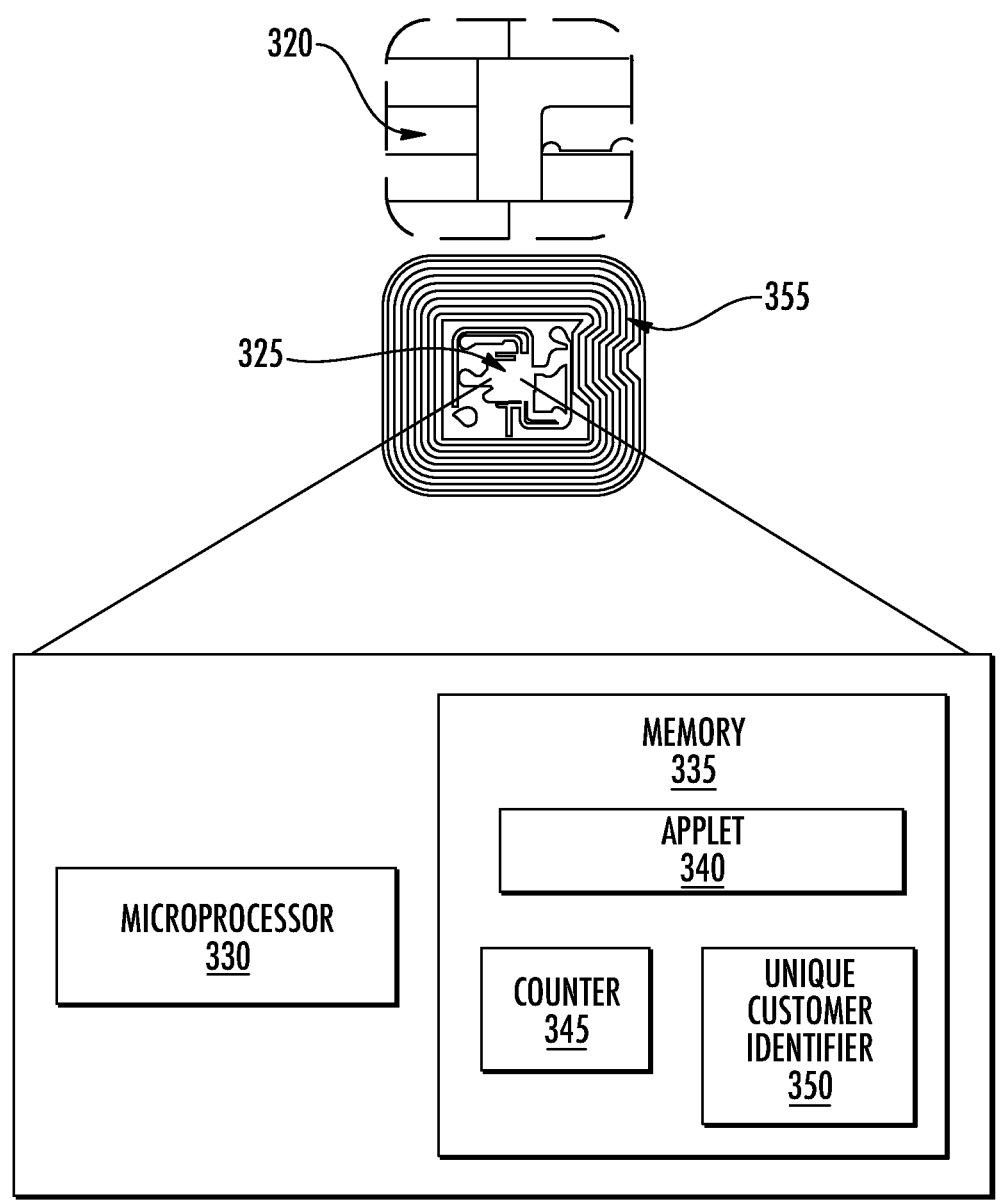
FIG. 3B illustrates an example contact pad of a contactless card in accordance with one or more embodiments.

As illustrated in FIG. 3B, the contact pad 320 of FIG. 3A may include processing circuitry 325 for storing and processing information, including a microprocessor 330 and a memory 335. It is understood that the processing circuitry 325 may contain additional components, including processors, memories, error and parity/CRC checkers, data encoders, anti-collision algorithms, controllers, command decoders, security primitives and tamper-proofing hardware, as necessary to perform the functions described herein.

The memory 335 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 335 may be configured to store one or more applets 340, one or more counters 345, and a customer identifier 350. The one or more applets 340 may include one or more software applications configured to execute on one or more contactless cards, such as Java Card applet. However, it is understood that applets 340 are not limited to Java Card applets, and instead may be any software application operable on contactless cards or other devices having limited memory. The one or more counters 345 may include a numeric counter sufficient to store an integer. The customer identifier 350 may include a unique alphanumeric identifier assigned to a user of the contactless card 300, and the identifier may distinguish the user of the contactless card from other contactless card users. In some examples, the customer identifier 350 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 320 or entirely separate from it or as further elements in addition to processor 330 and memory 335 elements located within the contact pad 320.

In some examples, the contactless card 300 may include one or more antennas 355. The one or more antennas 355 may be placed within the contactless card 300 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of contactless card 300 may act as the secondary of an air core transformer. The terminal may communicate with the contactless card 300 by cutting power or amplitude modulation. The contactless card 300 may infer the data transmitted from the terminal using the gaps in the contactless card's power connection, which may be functionally maintained through one or more capacitors. The contactless card 300 may communicate back by switching a load on the contactless card's coil or load modulation. Load modulation may be detected in the terminal's coil through interference.

As explained above, the contactless cards 300 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that includes a cryptographically secure OTP encoded as an NDEF text tag.

Figure 4:
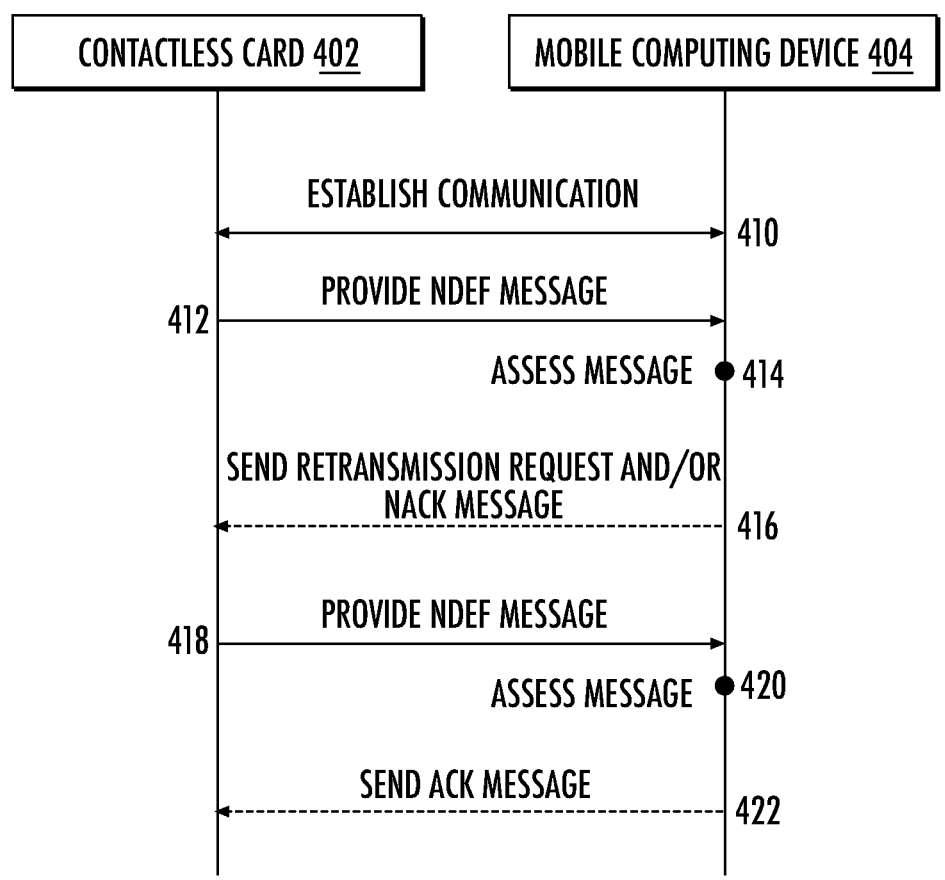
FIG. 4 illustrates an example sequence diagram of a feedback mechanism between a contactless card and a mobile computing device in accordance with one or more embodiments.

FIG. 4 illustrates an example sequence diagram 400 of a feedback mechanism between a contactless card 402 and a mobile computing device 404 according to one or more embodiments. The mobile computing device 404 may be a client device, such as a smartphone configured to communicate with the contactless card 402. As described above, the mobile computing device 404 may include at least an NFC card reader configured to establish NFC communication with the contactless card via an NFC reader coil.

At step 410, communication may be established between the contactless card 402 and the mobile computing device 404. In examples, the communication may be automatically established upon the contactless card entering an active magnetic field generated by the NFC reader coil of the mobile computing device. In other examples, the mobile computing device 404 may first establish communication by sending the contactless card 402 a signal when the computing device 404 detects that the contactless card 402 has entered the active magnetic field generated by the NFC reader coil. It may be understood that step 410 may be an optional step. In examples, the contactless card may automatically start providing messages to the mobile computing device 404 as soon as the card enters the active magnetic field of the NFC reader coil of the mobile computing device.

At step 412, the contactless card 402 may transmit or provide an NDEF message to the mobile computing device. The NDEF message, for example, may include one or more NDEF records, each of which may include one or more NDEF payloads and associated headers, flags, etc. In the one or more NDEF payloads (or any other suitable portion of the NDEF message), a checksum or a checksum value may be included. Further included in the NDEF message may be information related to the type of checksum function or algorithm used to generate the embedded checksum value.

At step 414, the mobile computing device may detect, receive, or access the NDEF message and assess the message. As will be further described below, the mobile computing device may perform a checksum calculation on the message content received in the one or more payloads using a checksum function or algorithm, such as the one specified in the NDEF message. After calculating the checksum, the mobile computing device may compare it with the checksum provided in the NDEF message. If the checksums match, then it may be determined that the entire NDEF message was correctly received. If the checksums do not match, the mobile computing device 404 may increase power to the NFC reader coil from the current power level, e.g., default or factory-set power level, to a second power level, e.g., a fraction of the maximum allowable power level for the reader coil.

Optionally, as depicted by the dashed arrow, at step 416, the mobile computing device 404 may send a retransmission request and/or a negative acknowledgment (NACK) message to the contactless card 402, which prompts the contactless card 402 to resend or provide again the NDEF message that was sent at step 412. Otherwise, if the contactless card 402 remains within the magnetic field generated by the NFC reader coil of the mobile computing device 404, the NDEF message may be continually made available for the mobile computing device to detect or receive until the entire NDEF message has been received. In additional or alternative examples, the contactless card 402 may automatically provide the NDEF message at predetermined intervals (e.g., every second, every five seconds, every 20 seconds, etc.), or a predetermined period of time, until the mobile computing device 404 has received the entire NDEF message. Thus, at step 418, the NDEF message is provided to the mobile computing device 404 for a second time, assuming the mobile computing device 404 had determined at step 414 that the full NDEF message had not been received based on the checksum calculation.

At step 420, the NDEF message is once again assessed. The mobile computing device 404 may calculate a new checksum for the NDEF message received at step 418 and determine whether it matches the checksum provided in the NDEF message. If the checksums match, the mobile computing device 404 may optionally send an acknowledgment (ACK) message at step 422, as shown by the dashed arrow. If the checksums do not match, the NDEF message may be provided yet again to the mobile computing device 404 and further assessed. This process may continue until the entire NDEF message has been received by the mobile computing device 404. In other examples, the entire process may stop after a predetermined number of iterations or a predetermined duration of time. An error message may be returned to the user via a user interface if the mobile computing device 404 fails to read the entire NDEF message after the predetermined number of iterations or the predetermined duration of time.

Figure 5:
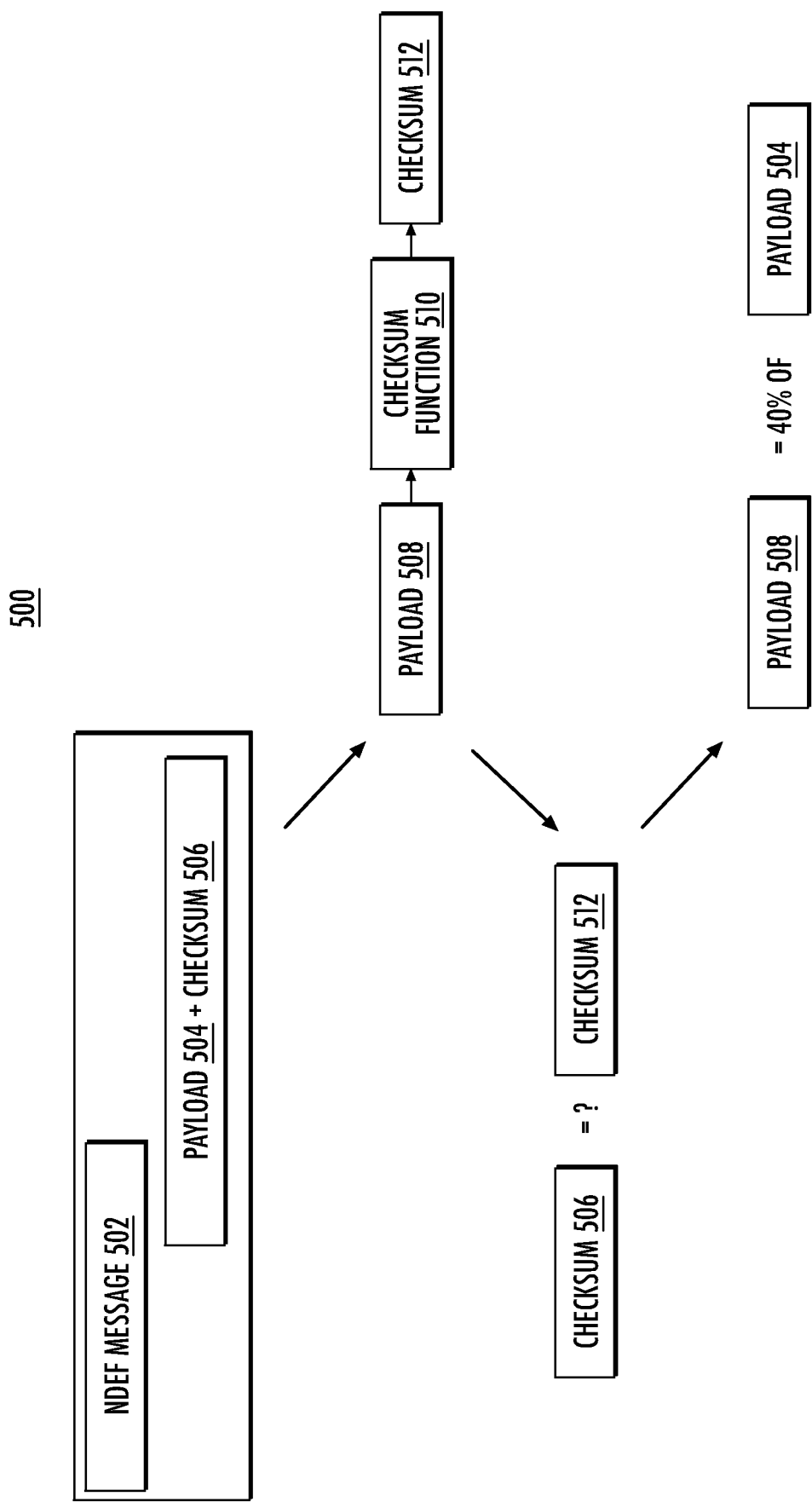
FIG. 5 illustrates an example checksum calculation in accordance with one or more embodiments.

FIG. 5 illustrates example checksum calculation 500 according to one or more embodiments. An NDEF message 502 may be provided to a mobile computing device by a contactless card. As shown, the NDEF message 502 includes a payload 504 and a checksum 506 associated with the payload 504. It may be understood that the payload 504 (as well as other payloads that may be included in the NDEF message 502) may include message content or any other suitable types of data. In examples, the NDEF message 502 may include information on how the checksum 506 was calculated, for instance, an indication of a specific checksum function, algorithm, or the like that was applied to the payload 504 to arrive at the checksum 506.

The payload 504 sent by the contactless card may be received by the mobile computing device as payload 508. The mobile computing device may then perform a checksum calculation on the received payload 508 using a checksum function (or algorithm) 510. As described above, the checksum function 510 may the checksum function indicated in the NDEF message 502. Alternatively, the checksum function 510 may be known, determined or agreed upon beforehand between the contactless card and the mobile computing device. It may be understood that the checksum function 510 may be based on any suitable type of algorithm, such as a parity byte or parity word algorithm, a modular sum algorithm, a position-dependent algorithm, etc., or other techniques, such as check digit, Damn algorithm, data rot, file verification, Fletcher's checksum, frame check sequence, "cksum," "md5sum," "sha1sum," SYSV checksum, "xxHash," etc., or any suitable type of hash function.

Upon applying the checksum function 510 to the received payload 508, a checksum 512 may be generated or derived. Thereafter, a determination may be made as to whether the checksums 512 and 506 match. In other instances, a determination may also be made as to whether the calculated checksum 512 is inaccurate or incomplete. In examples, the calculated checksum 512 (and/or the comparison thereof to checksum 506) may reveal what percentage of the original payload 504 in NDEF message 502 was correctly received by the mobile computing device in payload 508. For instance, as shown, it may be determined that payload 508 contains only 40 percent of the message content of the original payload 504. As will be further described below, based on this determination, the power supplied to the NFC reader coil of the mobile computing device may be increased accordingly.

Figure 6:
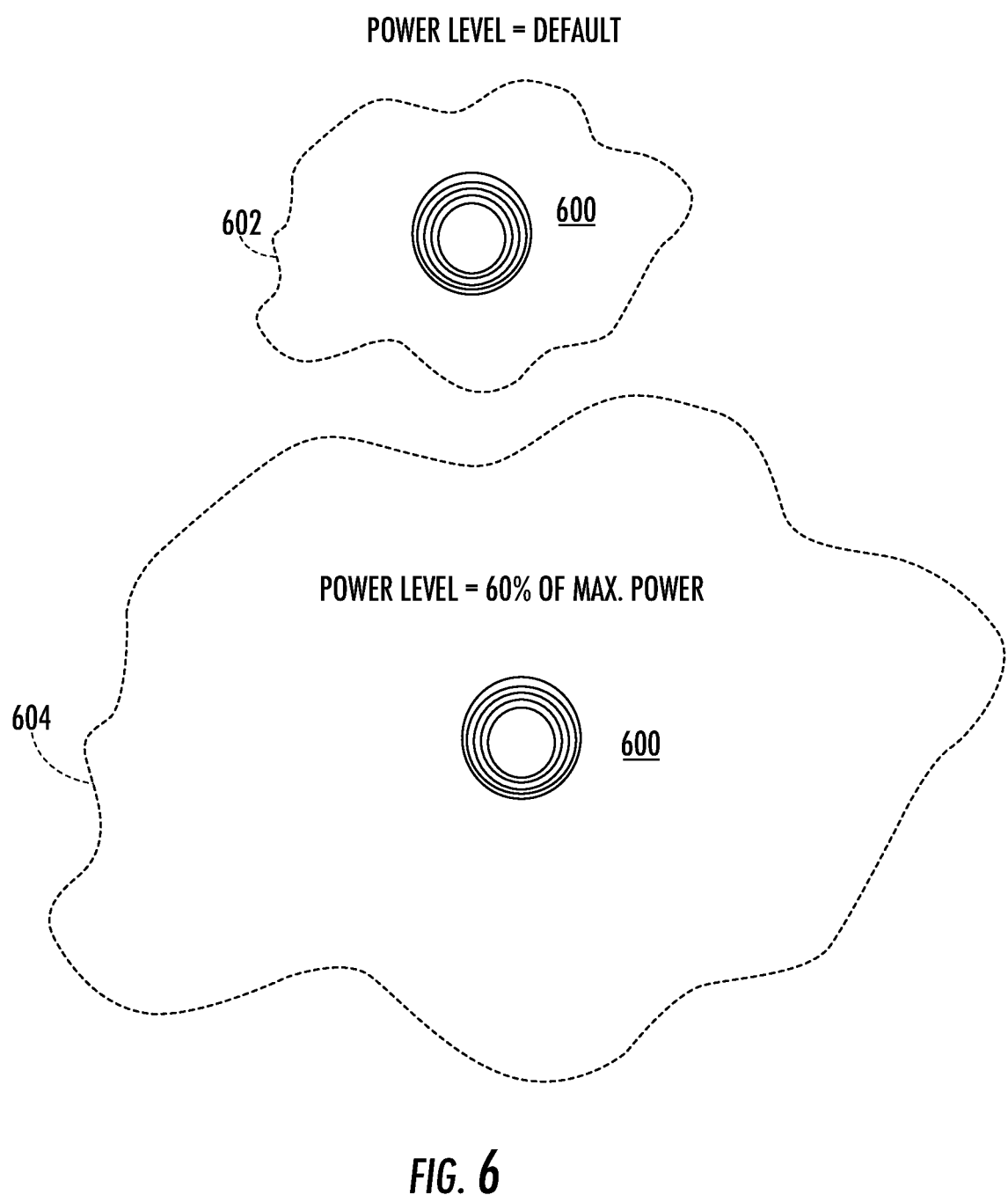
FIG. 6 illustrates an example adjustment of a power level of a reader coil in accordance with one or more embodiments.

FIG. 6 illustrates an example adjustment of a power level of a reader coil 600 according to one or more embodiments. As illustrated, the reader coil 600 of an NFC reader of a mobile computing device may be set at a default power level, which generates a magnetic field 602 corresponding to the default power level. In examples, the default power level may be a preset power level, a factory-setting, or the like.

To improve communication between a contactless card and the mobile computing device, the power to the reader coil 600 may be increased to a second power level to generate a larger magnetic field, e.g., magnetic field 604. For example, referring back to FIG. 5, if only 40 percent of the NDEF message was correctly received by the mobile computing device, the device may increase power to the reader coil 600 from the default power level to a power level that is 60% of the maximum allowable power providable to the reader coil 600. Thus, in other words, the second power level, or the dynamically adjusted power level, may be a fraction or portion of the maximum power providable to the reader coil 600, where the fraction is inversely proportional to the percentage of the NDEF message that has been correctly detected or received. It may be understood that maximum allowable power or maximum power level means the maximum amount of power that can be provided to the reader coil 600 without damaging or burning the coil 600.

According to further examples, the power to the reader coil 600 may be dynamically adjusted to any suitable level. For instance, if the percentage of the NDEF message that was correctly received falls below a predetermined threshold percentage, such as 20 percent, 15 percent, etc., then the power to the reader coil 600 may be increased to the maximum power level.

In some examples, it may be possible that the mobile computing device still does not receive the entire NDEF message despite ramping up the power level of the reader coil 600 to its maximum allowable power. In these instances, the mobile computing device, via a user interface, may further instruct the user to move or place the contactless card closer to a specific location on the mobile computing device or at a precise angle or orientation near the reader coil 600.

It may be understood that the shapes of the magnetic fields 602, 604 and the shape and configuration of the reader coil 600 are for illustration purposes and are not limited thereto.

FIG. 7 illustrates an example store-and-compare technique for one or more portions of an NDEF message according to one or more embodiments. This technique relates to storing and piecing together fragments of the NDEF message over multiple reads to eventually acquire the full NDEF message. By way of example, a contactless card may provide an NDEF message that contains at least payload 702. A mobile computing device may detect or receive the NDEF message, and based on a checksum calculation; the mobile computing device may determine that only a portion or a percentage of the payload 702 of the NDEF message, e.g., payload portion 704, has been received. In response, the mobile computing device may store the received payload portion 704 in memory.

After the power to the NFC reader coil of the mobile computing device has been dynamically adjusted, the contactless card may again provide the NDEF message that contains at least the payload 702. Another checksum calculation by the mobile computing device may be performed. Based on this calculation, the mobile computing device may determine that, again, only a portion of the payload 702, e.g., payload portion 706. The mobile computing device may also store the received payload portion 706.

At this point, the mobile computing device may compare the stored payload portions ("PPs") 704 and 706. For example, the payload portions may be compared for any redundancies or overlaps in the message content of the payload 702. If any redundancies in the message content are found, they may be removed. The payload portions 704 and 706 may be combined, and the mobile computing device may perform a new checksum calculation on the "combined" payload. If the new checksum matches the checksum provided in the NDEF message, this indicates that the message content payload 702 has been fully and entirely acquired via the combination of the payload portions 704 and 706, which were received in two separate reads.

If the new checksum, however, does not match the checksum provided in the NDEF message, or if the new checksum is incomplete or inaccurate, then the store-and-compare technique may continue. As shown, payload portion 708 may be subsequently received. The payload portions 704, 706, and 708 may be compared for any redundancies, and then combined to calculate a new checksum. A similar approach may be applied to payload portion 710, and so on.

The store-and-compare technique may be advantageous in that pieces or fragments of the message content in payload 702 may be collected over time or over multiple reads or iterations, which may be later compared, combined, and analyzed to determine if the pieces or fragments collectively add up to arrive at the entire message contained in payload 702. Accordingly, this technique compensates for the fact that the mobile computing device may not ever acquire the entire payload 702 at each read.

Figure 8:
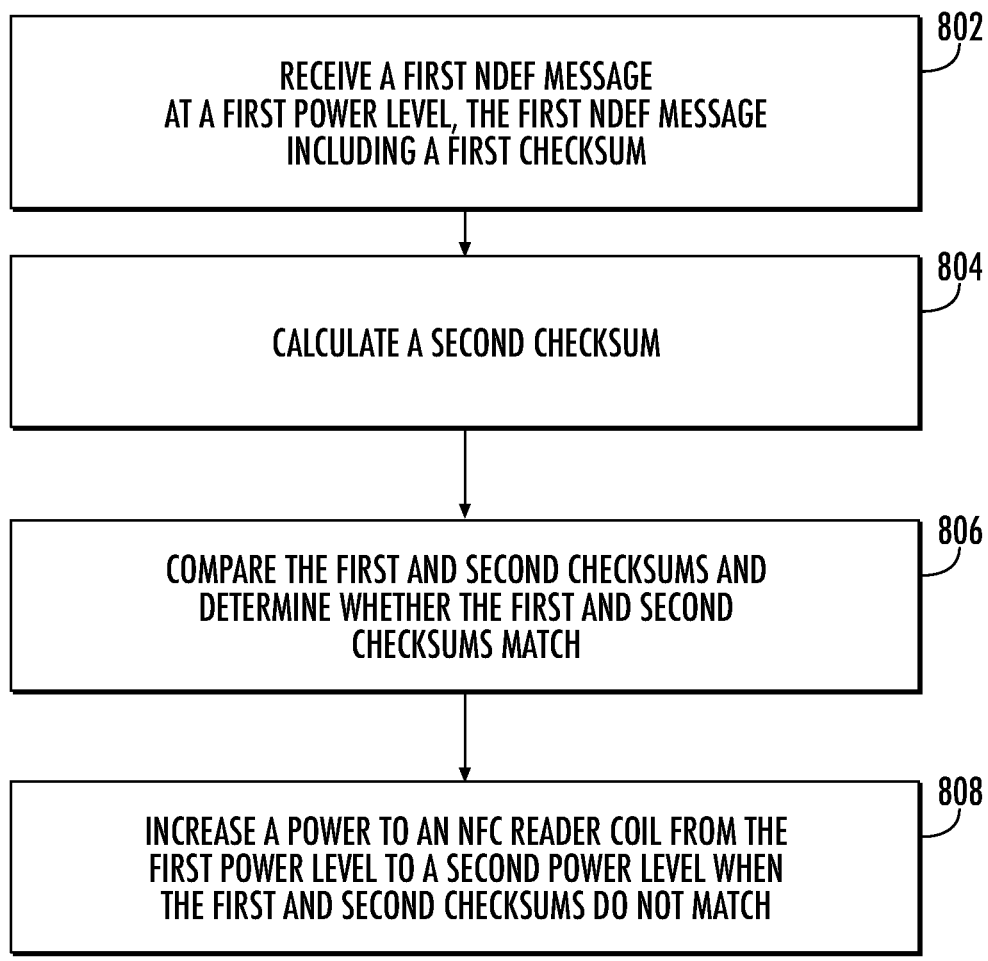
FIG. 8 illustrates an example flow diagram in accordance with one or more embodiments.

FIG. 8 illustrates an example flow diagram 800 according to one or more embodiments. The flow diagram 800 is related to dynamically increasing power to an NFC reader coil from a first power level to a second power level. It may be understood that the features associated with the illustrated blocks may be performed or executed by one or more computing devices, e.g., a mobile computing device, and/or processing circuitry contained therein. Moreover, it may be understood that the blocks in flow diagram 800 are not limited to any specific order, and the one or more blocks may be performed or executed simultaneously.

At block 802, a first NDEF message or file may be received via an NFC reader coil at a first power level, which may be a default power level. The first NDEF message may include message content, e.g., data, which may be contained in one or more payloads, and may include a first checksum associated with the message content.

At block 804, a second checksum may be calculated. As described above, a checksum function or algorithm may be applied to the received message content or the message data to calculate the second checksum. The second checksum may be indicative of the accuracy, integrity, and/or completeness of the first NDEF message received from the contactless card.

At block 806, the first checksum and the second checksum may be compared, and it may be determined whether the first and second checksums match. If the first and second checksums match, it may indicate that the first NDEF message has been correctly received.

If the first and second checksums do not match, at block 808, the power to the NFC reader coil may be increased from the first power level to a second power level. The second power level may be dynamically determined and adjusted. For example, if a certain percentage of the NDEF message has been correctly received, the second power level may be set to a fraction of a maximum power providable to the NFC reader coil, where the fraction is inversely proportional to the percentage of the NDEF message that was correctly received. In other examples, the second power level may be the maximum power level if the percentage of the NDEF that was correctly received is below a predetermined percentage threshold.

While the embodiments and examples described above involve a reader coil implemented in a mobile computing device, it may be understood that the power to any NFC reader installed in any type of device may be dynamically adjusted to improve NFC communication. Moreover, the above described NDEF messages and corresponding payloads may include message content or data related to various use cases of the contactless card, such as contactless card activation, user verification, user authentication, various transactions, sales, purchases, etc.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be used together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising:
   memory for storing instructions; and
   one or more processors, coupled with the memory, operable to execute the instructions, that when executed, cause the one or more processors to:
   receive a near field communication data exchange format (NDEF) message from a contactless card via a near field communication (NFC) reader;
   determine how much of the NDEF message was correctly received by performing a checksum calculation, wherein the checksum calculation is based at least in part on a checksum value included in the NDEF message; and
   adjust power to the NFC reader based at least in part on the determination of how much of the NDEF message was correctly received.

2. The apparatus of claim 1, wherein the power to the NFC reader is adjusted if one or more portions of the NDEF message was not correctly received, and
   wherein the adjustment of the power comprises the one or more processors to increase power to the NFC reader from a first power level to a second power level such that a magnetic field emitted from the NFC reader is increased or strengthened.

3. The apparatus of claim 2, wherein the one or more processors is further caused to:
receive a subsequent NDEF message from the contactless card at the second power level;
determine that the subsequent NDEF message, in entirety, was correctly received; and
decrease the power to the NFC reader coil from the second power level to the first power level.

4. The apparatus of claim 2, wherein the first power level is a preset power level and the second power level is a maximum power providable to the NFC reader.

5. The apparatus of claim 2, wherein the power provided to the NFC reader at the second power level is: (i) a fraction of a maximum power providable to the NFC reader, wherein the fraction of the maximum power is inversely proportional to a percentage of the NDEF message that was correctly received or (ii) the maximum power providable to the NFC reader if the percentage of the first NDEF message that was correctly received is at or below a predetermined threshold percentage.

6. The apparatus of claim 2, wherein the one or more processors is further caused to automatically decrease the power to the NFC reader from the second power level to the first power level after a predetermined period of time.

7. The apparatus of claim 2, wherein the one or more processors is further caused to:
receive a subsequent NDEF message from the contactless card at the second power level;
determine that one or more portions of the subsequent NDEF message was not correctly received; and
display one or more instructions for physically repositioning the contactless card relative to a location of the NFC reader.

8. The apparatus of claim 2, wherein the one or more processors is further caused to:
receive a subsequent NDEF message at the second power level, wherein respective message contents of the NDEF message and the subsequent NDEF message are identical;
store one or more portions of the NDEF message that was correctly received; and
determine whether the message content has been acquired, in entirety, based on a comparison of one or more portions of the subsequent NDEF message that was correctly received to the stored one or more portions of the NDEF message that was correctly received.

9. A method comprising:
receiving, via a near field communication (NFC) reader, an NFC data exchange format (NDEF) message from a contactless card;
determining, via one or more processors, how much of the NDEF message was correctly received by performing a checksum calculation, wherein the checksum calculation is based at least in part on a checksum value included in the NDEF message; and
adjusting power to the NFC reader based at least in part on the determining of how much of the NDEF message was correctly received.

10. The method of claim 9, wherein the power to the NFC reader is adjusted if one or more portions of the NDEF message was not correctly received, and
wherein the adjusting of the power comprises increasing power to the NFC reader from a first power level to a second power level such that a magnetic field emitted from the NFC reader is increased or strengthened.

11. The method of claim 10, wherein the power provided to the NFC reader at the second power level is: (i) a fraction of a maximum power providable to the NFC reader, wherein the fraction of the maximum power is inversely proportional to a percentage of the NDEF message that was correctly received or (ii) the maximum power providable to the NFC reader if the percentage of the first NDEF message that was correctly received is at or below a predetermined threshold percentage.

12. The method of claim 10, further comprising automatically decreasing the power to the NFC reader from the second power level to the first power level after a predetermined period of time.

13. The method of claim 10, further comprising:
receiving, via the NFC reader, a subsequent NDEF message from the contactless card at the second power level;
determining, via the one or more processors, that one or more portions of the subsequent NDEF message was not correctly received; and
displaying, via a display, one or more instructions for physically repositioning the contactless card relative to a location of the NFC reader.

14. The method of claim 10, further comprising:
receiving, via the NFC reader, a subsequent NDEF message at the second power level, wherein respective message contents of the NDEF message and the subsequent NDEF message are identical;
storing, in memory, one or more portions of the NDEF message that was correctly received; and
determining, via the one or more processors, whether the message content has been acquired, in entirety, based on a comparison of one or more portions of the subsequent NDEF message that was correctly received to the stored one or more portions of the NDEF message that was correctly received.

15. A non-transitory computer-readable storage medium storing computer-readable program code executable by a processor to:
receive a near field communication data exchange format (NDEF) message from a contactless card via a near field communication (NFC) reader;
determine how much of the NDEF message was correctly received by performing a checksum calculation, wherein the checksum calculation is based at least in part on a checksum value included in the NDEF message; and
adjust power to the NFC reader based at least in part on the determination of how much of the NDEF message was correctly received.

16. The non-transitory computer-readable storage medium of claim 15, wherein the power to the NFC reader is adjusted if one or more portions of the NDEF message was not correctly received, and
wherein the adjustment of the power comprises the processor to increase power to the NFC reader from a first power level to a second power level such that a magnetic field emitted from the NFC reader is increased or strengthened.

17. The non-transitory computer-readable storage medium of claim 16, wherein the power provided to the NFC reader at the second power level is: (i) a fraction of a maximum power providable to the NFC reader, wherein the fraction of the maximum power is inversely proportional to a percentage of the NDEF message that was correctly received or (ii) the maximum power providable to the NFC reader if the percentage of the first NDEF message that was correctly received is at or below a predetermined threshold percentage.

18. The non-transitory computer-readable storage medium of claim 16, further storing program code executable by the processor to automatically decrease the power to the NFC reader from the second power level to the first power level after a predetermined period of time.

19. The non-transitory computer-readable storage medium of claim 16, further storing program code executable by the processor to:
   receive a subsequent NDEF message from the contactless card at the second power level;
   determine that one or more portions of the subsequent NDEF message was not correctly received; and
   display one or more instructions for physically repositioning the contactless card relative to a location of the NFC reader.

20. The non-transitory computer-readable storage medium of claim 16, further storing program code executable by the processor to:
   receive a subsequent NDEF message at the second power level, wherein respective message contents of the NDEF message and the subsequent NDEF message are identical;
   store one or more portions of the NDEF message that was correctly received; and
   determine whether the message content has been acquired, in entirety, based on a comparison of one or more portions of the subsequent NDEF message that was correctly received to the stored one or more portions of the NDEF message that was correctly received.

* * * * *